United States Patent
Popovski et al.

(10) Patent No.: US 11,251,489 B2
(45) Date of Patent: Feb. 15, 2022

(54) BATTERY ASSEMBLY HAVING A SUPPORT POST AND BATTERY MODULE SUPPORTING METHOD UTILIZING A SUPPORT POST

(71) Applicant: Ford Global Technologies, LLC, Dearborn, MI (US)

(72) Inventors: Mike Popovski, Warren, MI (US); Ihab Grace, Grosse Pointe Woods, MI (US); Abigail Christensen, Canton, MI (US); John Jardine, Harrison Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 16/568,471

(22) Filed: Sep. 12, 2019

(65) Prior Publication Data

US 2021/0083239 A1 Mar. 18, 2021

(51) Int. Cl.
*H01M 50/20* (2021.01)
*H01M 50/557* (2021.01)
*H01M 50/209* (2021.01)

(52) U.S. Cl.
CPC ......... *H01M 50/20* (2021.01); *H01M 50/209* (2021.01); *H01M 50/557* (2021.01)

(58) Field of Classification Search
CPC ... H01M 50/20; H01M 50/209; H01M 50/557
See application file for complete search history.

(56) References Cited

U.S. PATENT DOCUMENTS

| | | | |
|---|---|---|---|
| 5,639,571 A * | 6/1997 | Waters | B60L 50/64 429/71 |
| 9,073,498 B2 | 7/2015 | Lee | |
| 9,963,028 B1 | 5/2018 | Pachore | |
| 2009/0183935 A1* | 7/2009 | Tsuchiya | B60K 1/04 180/68.1 |
| 2012/0244397 A1* | 9/2012 | TenHouten | H01M 50/20 429/61 |
| 2016/0056426 A1* | 2/2016 | Subramanian | H01M 50/20 429/151 |
| 2016/0293906 A1* | 10/2016 | Ito | B60K 1/04 |
| 2017/0305249 A1* | 10/2017 | Hara | H01M 50/20 |
| 2018/0050607 A1* | 2/2018 | Matecki | B60L 50/64 |

FOREIGN PATENT DOCUMENTS

| | | |
|---|---|---|
| CN | 109823154 | 5/2019 |
| CN | 208970599 | 6/2019 |

* cited by examiner

*Primary Examiner* — Vuthe Siek
(74) *Attorney, Agent, or Firm* — David B. Kelley; Carlson, Gaskey & Olds, P.C.

(57) ABSTRACT

A battery assembly includes, among other things, an upper tier tray, an upper battery module supported on the upper tier tray, and a post that supports the upper tier tray. A battery module support method according to another exemplary aspect of the present disclosure includes, among other things, supporting an upper tier tray with a post; and supporting an upper battery module with the upper tier tray.

17 Claims, 5 Drawing Sheets

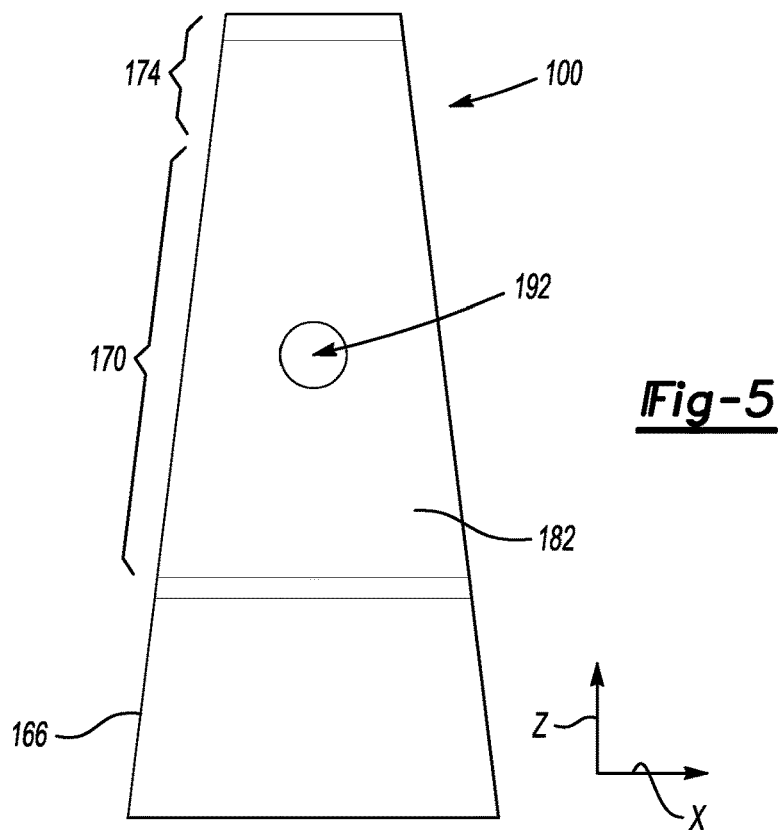
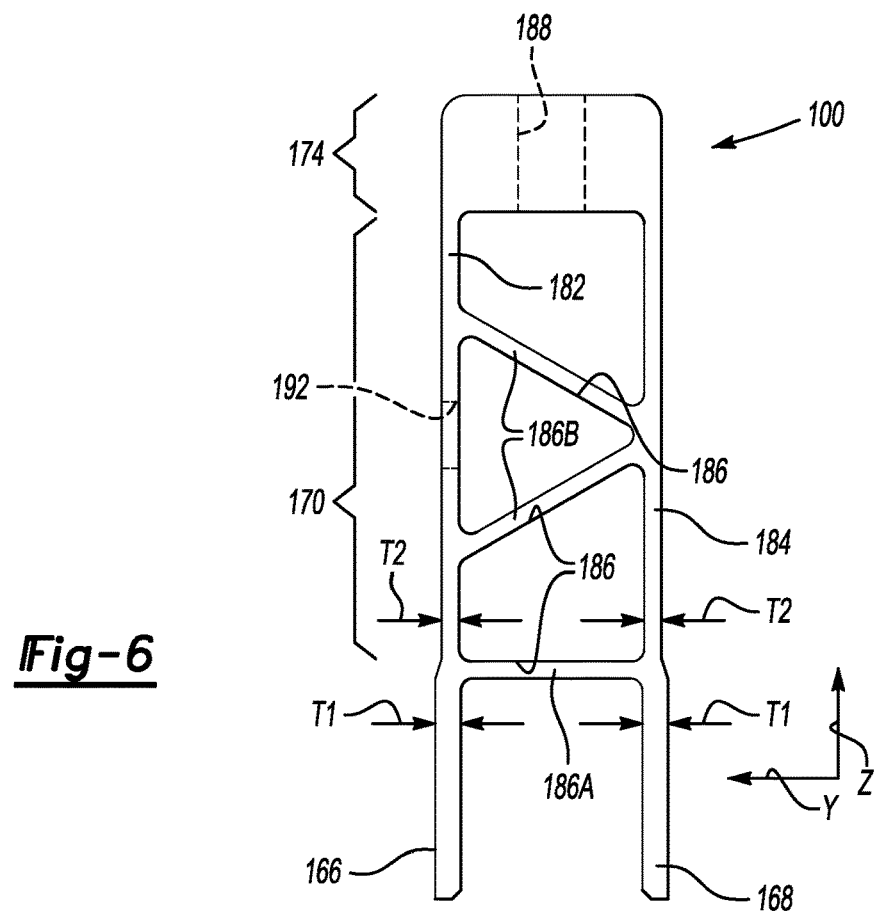

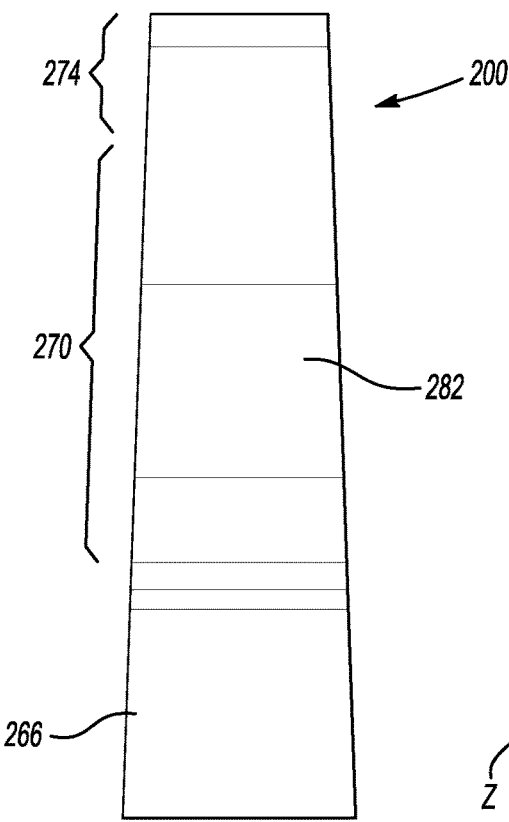
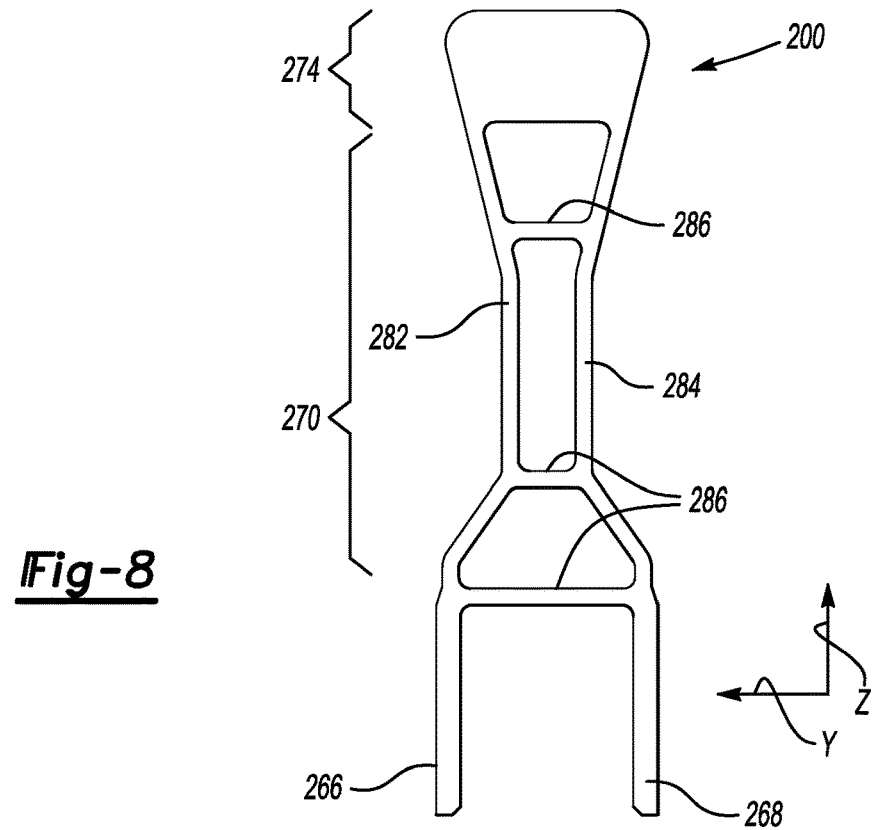

BATTERY ASSEMBLY HAVING A SUPPORT POST AND BATTERY MODULE SUPPORTING METHOD UTILIZING A SUPPORT POST

TECHNICAL FIELD

This disclosure relates generally to supporting a battery module within a traction battery and, in particular, to using at least one post to support an upper tier battery module within an enclosure.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery modules each including a plurality of interconnected battery cells. The battery modules can be arranged in tiers within the traction battery. In the past, upper tiers of battery modules have been supported with stamped sheet-metal support brackets.

SUMMARY

A battery assembly, according to an exemplary aspect of the present disclosure includes, among other things, an upper tier tray, an upper battery module supported on the upper tier tray, and a post that supports the upper tier tray.

Another example of the foregoing assembly includes a lower battery module on a lower tier. The lower battery module is vertically beneath the upper tier tray and the upper battery module.

Another example of any of the foregoing assemblies includes an enclosure and a cross-member within an interior of the enclosure. The post is mounted on the cross-member.

In another example of any of the foregoing assemblies, the post is one of a plurality of posts that are mounted on the cross-member and that support the upper tier tray.

Another example of any of the foregoing assemblies includes a first attachment flange of the post and a second attachment flange of the post. The first attachment flange is secured to a first horizontally facing side of the cross-member. The second attachment flange is secured to an opposite, second horizontally facing side of the cross-member.

Another example of any of the foregoing assemblies includes a tower portion of the post. The first and second flanges extend vertically downward from the tower portion.

In another example of any of the foregoing assemblies, the tower portion tapers as the post extends vertically upward.

In another example of any of the foregoing assemblies, the tower portion includes a first outer wall, a second outer wall, and a plurality of webs extending between the first outer wall and the second outer wall.

In another example of any of the foregoing assemblies, the plurality of webs includes at least a first web and a second web. The first web is oriented horizontally and placed against a vertically facing surface of the cross-member. The second web is oriented along a vertically angled plane.

In another example of any of the foregoing assemblies, the first attachment flange is an extension of the first outer wall, and the second attachment flange is an extension of the second outer wall.

In another example of any of the foregoing assemblies, a thickness of the first attachment flange is greater than a thickness of the first outer wall, and a thickness of the second attachment flange is greater than a thickness of the second outer wall.

In another example of any of the foregoing assemblies, the first and second outer walls extend vertically to a platform. The platform is configured to couple to a mechanical fastener to secure the upper tier tray to the post.

In another example of any of the foregoing assemblies, the platform comprises a threaded bore.

In another example of any of the foregoing assemblies, the first horizontally facing side faces forward relative to an orientation of an associated vehicle. Further, the second horizontally facing side faces rearward relative to the orientation of the associated vehicle.

A battery module support method according to another exemplary aspect of the present disclosure includes, among other things, supporting an upper tier tray with a post, and supporting an upper battery module with the upper tier tray.

In another example of the foregoing method, the post is secured to a cross-member within a traction battery.

Another example of any of the foregoing methods includes securing a first attachment flange of the post to a first horizontally facing side of the cross-member and a second attachment flange of the post to an opposite, second horizontally facing side of the cross-member.

In another example of any of the foregoing methods, the first horizontally facing side faces forward relative to an orientation of an associated vehicle, and the second horizontally facing side faces rearward relative to the orientation of the associated vehicle.

In another example of any of the foregoing methods, the post tapers toward a vertically upper end.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 5 illustrates a front view of the post of FIG. 4.

FIG. 6 illustrates a side view of the post of FIG. 4.

FIG. 7 illustrates a front view of another post from the traction battery of FIG. 2.

FIG. 8 illustrates a side view of the post of FIG. 7.

DETAILED DESCRIPTION

A traction battery of an electrified vehicle can include battery modules arranged in tiers. This disclosure details assemblies and methods that are used to support battery modules within an upper tier.

The assemblies and methods utilize a post. The post can facilitate distributing loads applied to the traction battery such as an impact load. Distributing loads with the post can help to prevent the upper tier of battery modules and its associated components from tipping and buckling in response to an applied load. Traction batteries with multiple tiers of battery modules can have an increased vertical height and higher center of gravity than traction battery packs with a single tier, which can make load absorption more difficult.

Figure 1:
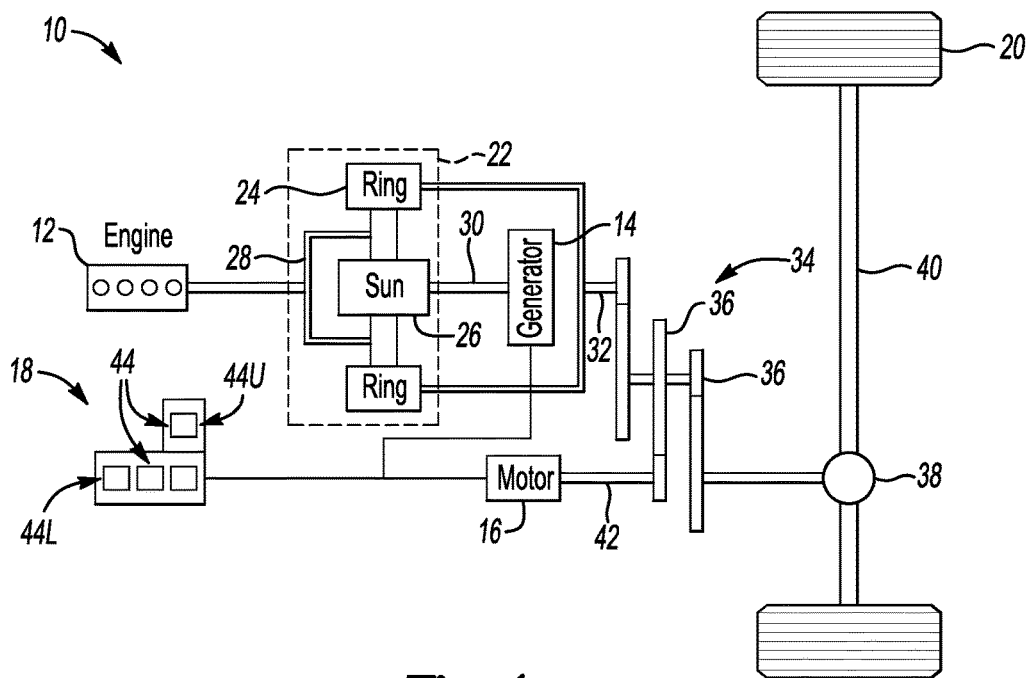
FIG. 1 schematically illustrates a powertrain of an electrified vehicle.

FIG. 1 schematically illustrates selected portions of a powertrain 10 of an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles (FCVs), and battery electrified vehicles (BEVs).

In an embodiment, the powertrain 10 is a powersplit powertrain system that employs a first drive system and a second drive system. The first drive system includes a combination of an engine 12 and a generator 14 (i.e., a first electric machine). The second drive system includes at least a motor 16 (i.e., a second electric machine), the generator 14, and at least one traction battery 18. In this example, the second drive system is considered an electric drive system of the powertrain 10. The first and second drive systems generate torque to drive one or more sets of vehicle drive wheels 20 of the electrified vehicle.

The engine 12, which is an internal combustion engine in this example, and the generator 14 may be connected through a power transfer unit 22. In one non-limiting embodiment, the power transfer unit 22 is a planetary gear set that includes a ring gear 24, a sun gear 26, and a carrier assembly 28. Of course, other types of power transfer units, including other gear sets and transmissions, may be used to connect the engine 12 to the generator 14.

The generator 14 can be driven by engine 12 through the power transfer unit 22 to convert kinetic energy to electrical energy. The generator 14 can alternatively function as a motor to convert electrical energy into kinetic energy, thereby outputting torque to a shaft 30 connected to the power transfer unit 22. Because the generator 14 is operatively connected to the engine 12, the speed of the engine 12 can be controlled by the generator 14.

The ring gear 24 of the power transfer unit 22 may be connected to a shaft 32, which is connected to vehicle drive wheels 20 through a second power transfer unit 34. The second power transfer unit 34 may include a gear set having a plurality of gears 36. Other power transfer units may also be suitable. The gears 36 transfer torque from the engine 12 to a differential 38 to ultimately provide traction to the vehicle drive wheels 20. The differential 38 may include a plurality of gears that enable the transfer of torque to the vehicle drive wheels 20. In this example, the second power transfer unit 34 is mechanically coupled to an axle 40 through the differential 38 to distribute torque to the vehicle drive wheels 20.

The motor 16 (i.e., the second electric machine) can also be employed to drive the vehicle drive wheels 20 by outputting torque to a shaft 42 that is also connected to the second power transfer unit 34. In one embodiment, the motor 16 and the generator 14 cooperate as part of a regenerative braking system in which both the motor 16 and the generator 14 can be employed as motors to output torque. For example, the motor 16 and the generator 14 can each output electrical power to the traction battery 18.

The traction battery 18 has the form of a high-voltage battery that is capable of outputting electrical power to operate the motor 16 and the generator 14. The traction battery 18 is a traction battery as the traction battery 18 provides power to drive the vehicle drive wheels 20.

In the exemplary embodiment, the traction battery 18 is a battery pack that includes a plurality of battery modules 44. Each of the battery modules 44 includes a plurality of individual battery cells.

In the exemplary embodiment, the traction battery 18 includes a plurality of lower battery modules 44L and a plurality of upper battery modules 44U. The upper battery modules 44U are vertically above the lower battery modules 44L. Arranging battery modules 44 in tiers can be necessary for packaging reasons and for other design reasons, such as increasing the energy density of the traction battery 18.

Vertical, for purposes of this disclosure, is with reference to ground and the normal orientation of the electrified vehicle and its traction battery 18 during operation.

Figure 2:
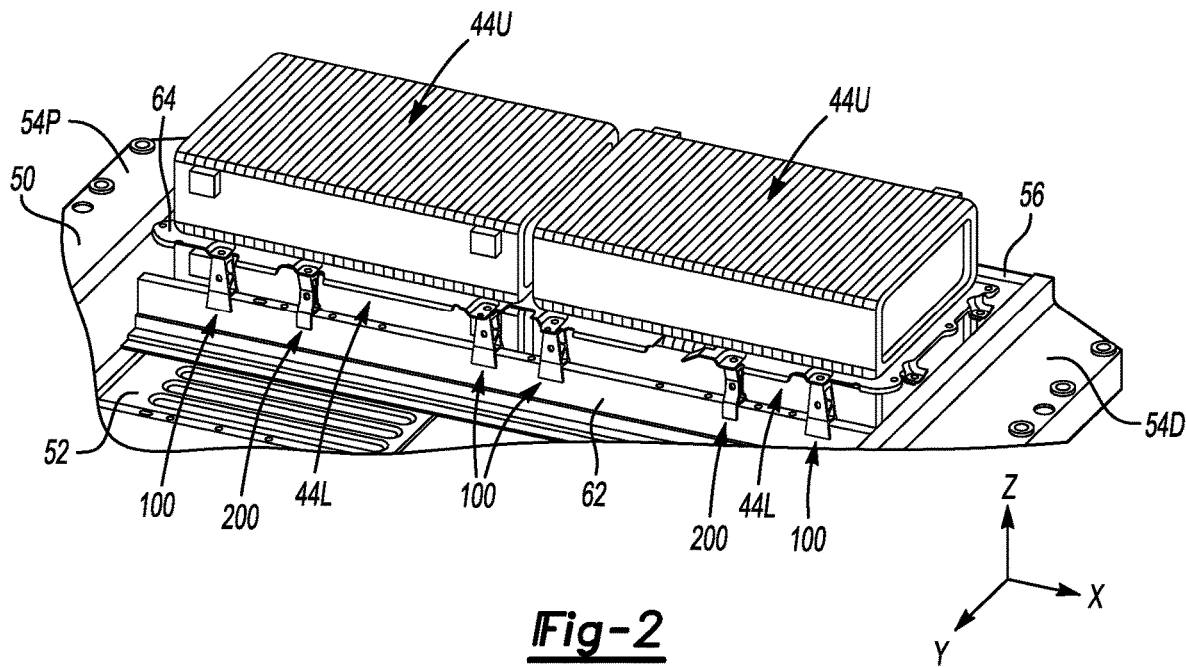
FIG. 2 illustrates a perspective view of selected portions of the traction battery of FIG. 1 with a lid of an enclosure removed to reveal tiers of battery modules within the traction battery.

With reference now to FIG. 2, the traction battery 18 includes an enclosure 50 that houses the battery modules 44 and other components. The enclosure 50 includes, among other things, an enclosure tray 52, a passenger side rail 54P, a driver side rail 54D, and an aft end rail 56.

The enclosure 50 further includes a lid, which has been removed in FIG. 2 to reveal the battery modules 44U, 44L. In the assembled traction battery 18, the lid can be secured to the enclosure tray 52 to enclose the battery modules 44.

Within an interior of the enclosure 50, a cross-member 62 extends in a cross vehicle direction from the driver side rail 54D to the passenger side rail 54P. The cross-member 62 can strengthen the traction battery 18 when, for example, an impact load is applied to a side of the vehicle having the traction battery 18. The cross-member 62 adds support and helps to control the kinematics of the traction battery 18 in response to an applied load.

Within the interior of the enclosure 50, the lower battery modules 44L are supported on the enclosure tray 52. The upper battery modules 44U are supported on an upper tier tray 64.

Figure 3:
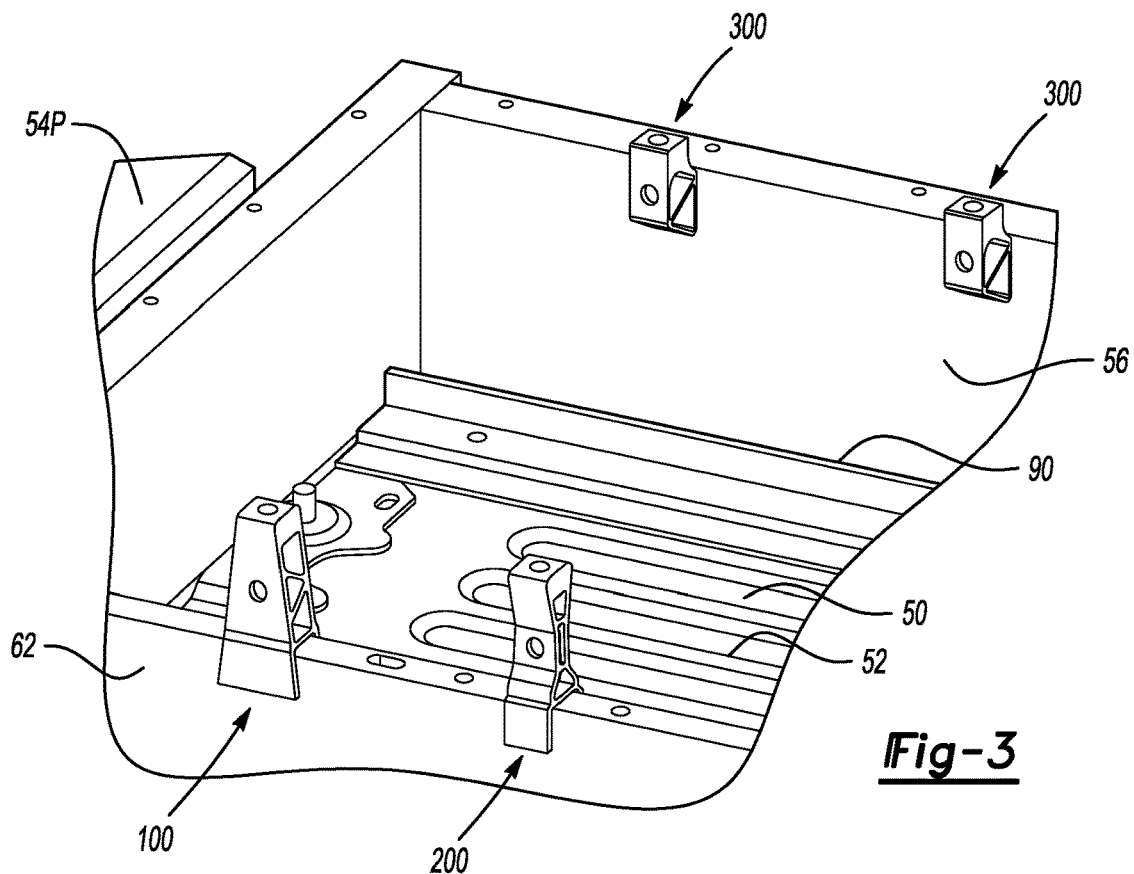
FIG. 3 illustrates a close-up view of an area of the traction battery of FIG. 2 with battery modules removed to show various posts utilized within the traction battery to support the battery modules of an upper tier.

With reference now to FIG. 3 and continuing reference to FIG. 2, the traction battery 18 utilizes posts 100, 200, 300 to support the upper tier tray 64 in a vertically elevated position within the enclosure 50. The posts 100 and 200 extend from the cross-member 62 to the upper tier tray 64. The posts 100 and 200 provide a load path from the upper tier tray 64 directly to the cross-member 62. The posts 300 extend from the aft end rail 56 to the upper tier tray 64. The posts 300 provide a load path from the upper tier tray directly to the aft end rails 56. The posts 300 are, notably, positioned entirely within an interior of the enclosure 50 of the traction battery 18.

The posts 100, 200, 300 can be extruded or cast. The posts 100, 200, 300 can be a metal or metal alloy material. In a specific example, the posts 100, 200, 300 are all extruded aluminum.

Figure 4:
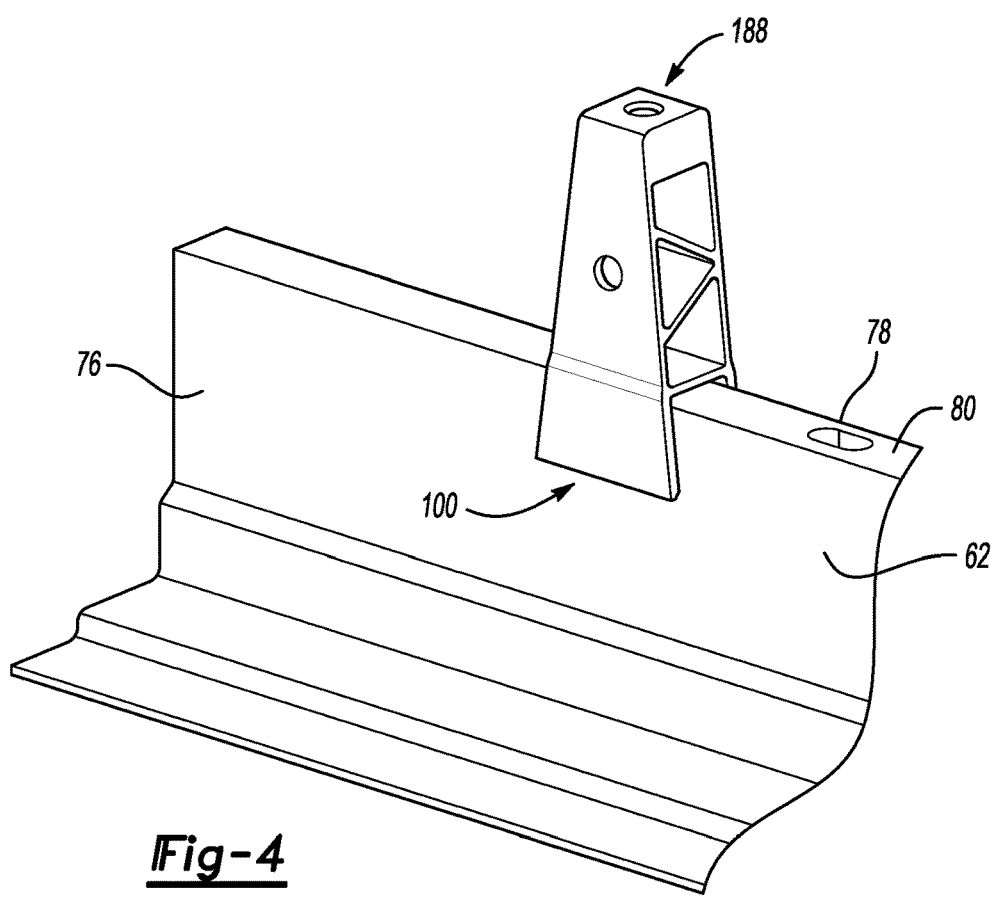
FIG. 4 illustrates a post of the traction battery of FIG. 2 extending from a cross-member of the traction battery.

As shown in FIGS. 4-6, the posts 100 include a first attachment flange 166, a second attachment flange 168, a tower portion 170, and a platform portion 174. The first attachment flange 166 and the second attachment flange 168 extend vertically downward from the tower portion 170.

When installed within the traction battery 18, the first attachment flange 166 is disposed against a first horizontally facing side 76 of the cross-member 62, and the second attachment flange 168 is disposed against a second horizontally facing side 78 of the cross-member 62 (FIG. 4). The first attachment flange 166 and the second attachment flange 168 can be secured directly to the cross-member 62 to secure the post 100 relative to the cross-member 62.

The attachment could include welding the first attachment flange 166 and the second attachment flange 168 to the cross-member 62. The welds can be metal inert gas (MIG) welds, for example. The first attachment flange 166 and the second attachment flange 168 can be secured to the cross-member 62 using techniques other than welding. For example, the first attachment flange 166 and the second attachment flange 168 could be bolted to the cross-member 62 or attached utilizing self-piercing rivets.

The tower portion 170 of the post 100 tapers as the tower portion 170 extends vertically upward away from the first attachment flange 166 and the second attachment flange 168 toward the platform portion 174. That is, a base area of the tower portion 170 is wider than the areas vertically above the base area.

The tower portion 170 includes a first outer wall 182, a second outer wall 184, and a plurality of webs 186 extending from the first outer wall 182 to the second outer wall 184. One of the webs 186A is disposed substantially horizontally and is configured to directly contact a vertically upward facing surface 80 of the cross-member 62. The other two webs 186B are angled relative to horizontal, although at different angles.

The first outer wall 182 faces forward toward a front of the vehicle when the traction battery 18 is mounted to the vehicle. The second outer wall 184 faces aft. The webs 186 thus extend along the longitudinal or Y-axis of the vehicle.

The webs 186 can decrease a weight of the post 100 when compared to a post having a substantially solid and continuous tower section. The webs 186 and tapering of the post 100 can increase bending stiffness of the post 100 and can increase a normal frequency associated with the post 100 when compared to a design without webs or tapering.

The enhanced bending stiffness can help to address noise, vibration, and harshness (NVH) issues, as well as issues associated with the upper tier tray 64 flexing in response to an applied load. The tapering and webs 186 can thus help to improve the kinematics of the traction battery 18 in response to a load.

The first attachment flange 166 and the second attachment flange 168 can each have a thickness T1 along the Y-axis, which is a longitudinal axis of the vehicle. The first outer wall 182 and the second outer wall 184 can each have a thickness T2, which is less than T1. The increased thickness of the first attachment flange 166 and the second attachment flange 168 can help to solidify the connection between the post 100 and the cross-member 62.

The platform portion 174 continues to taper vertically upward from the tower portion 170. The tapering of the platform portion 174 can further help to improve the kinematics of the traction battery 18 in response to a load.

The platform portion 174, in the exemplary embodiment, provides a threaded bore 188. A mechanical fastener can extend through an aperture in the upper tier tray 64 to engage the threaded bore 188 thereby securing the upper tier tray 64 relative to the post 100. In another exemplary embodiment, the bore 88 could be omitted and a threaded rod could extend upwardly from the platform portion 174 of the post 100.

The post 100 further includes an aperture 192 within the first outer wall 182. The aperture 192 can be used as an anchoring location for securing wiring, piping, etc. The aperture 192 could, for example, receive a push-in rivet or Christmas tree fastener that is utilized to anchor wires extending to the lower modules 44L or other areas of the traction battery 18.

With reference now to FIGS. 7 and 8, another exemplary post 200 is utilized to secure the upper tier tray 64 relative to the cross-member 62. The post 200 may be used rather than the post 100 to, for example, accommodate packaging requirements.

The post 200 includes a first attachment flange 266 and a second attachment flange 268. The first attachment flange 266 and the second attachment flange 268 are similar in design to the first attachment flange 266 and the second attachment flange 268 of the post 200.

The post 200 further includes a tower portion 270 and a platform 274. The tower portion 270 differs from the tower portion 170 of the post 100 due to, among other things, the tapering. Generally, the tower portion 270 tapers upward to an area of the tower portion 270 having a reduced dimension along the Y-axis, and then expands outward along the Y-axis. This results in the tower portion 270 having an hourglass type profile when viewed from a lateral side.

The tower portion 270 includes webs 286 extending from a first outer wall 282 and a second outer wall 284. The webs 286 are all substantially horizontally aligned. Like the post 100, a thickness along the Y-axis of the first attachment flange 266 and second attachment flange 268 is greater than a thickness of the corresponding first outer wall 282 and second outer wall 284.

Figure 9:
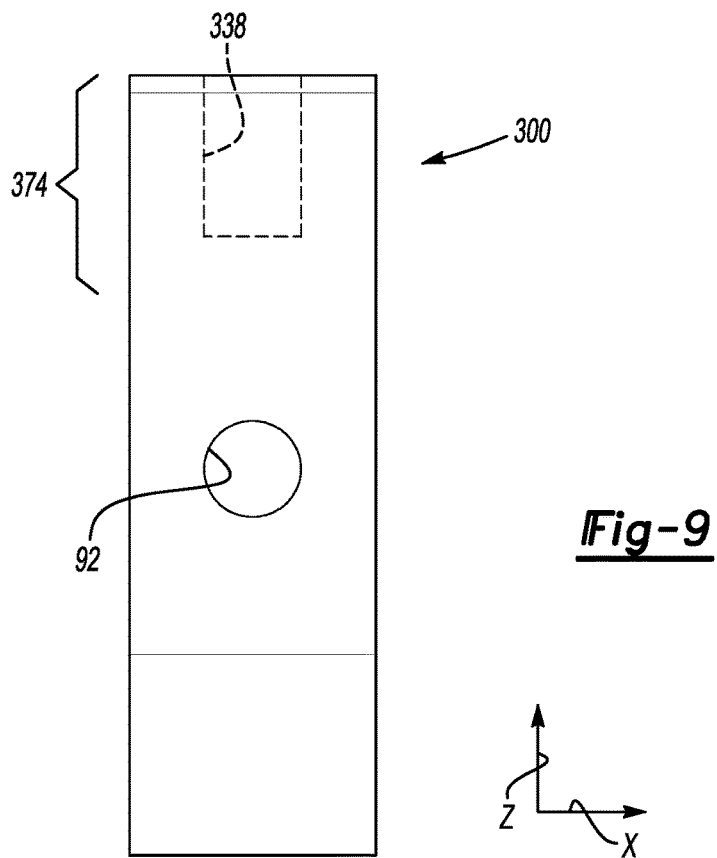
FIG. 9 illustrates a front view of another post from the traction battery of FIG. 2.
Figure 10:
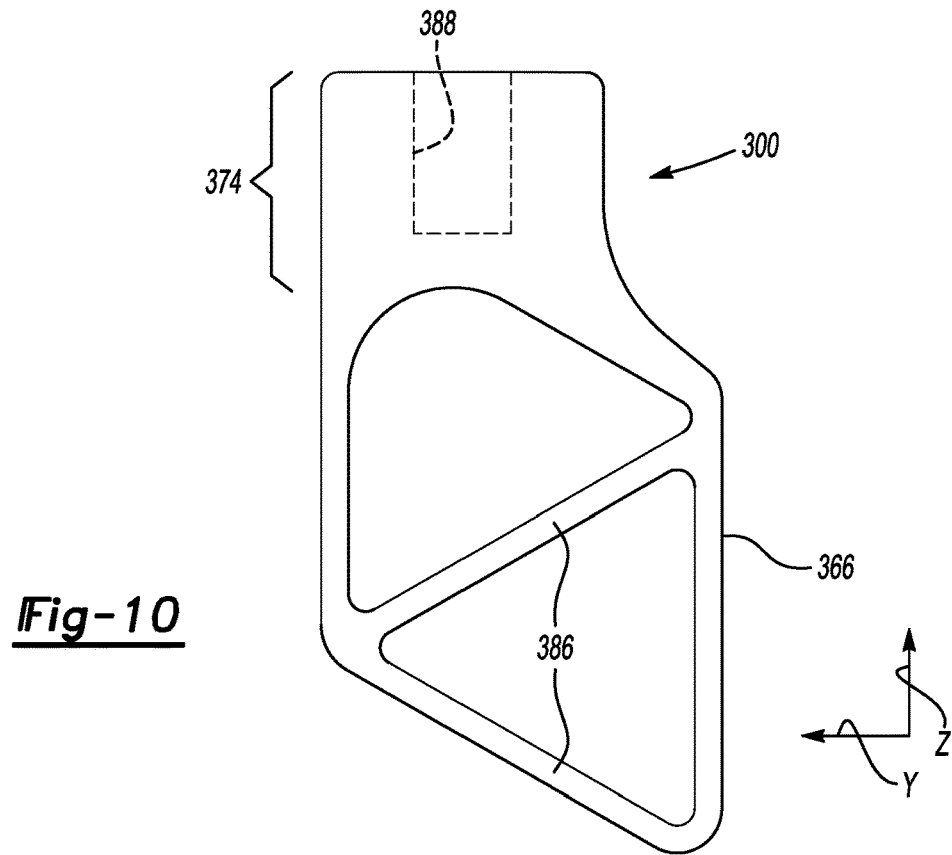
FIG. 10 illustrates a side view of the post of FIG. 9.

With reference now to FIGS. 9 and 10, the remaining exemplary post 300 is utilized to attach and secure the upper tier tray 64 to the aft end rail 56. The post 300 includes an attachment flange 366 that can be welded, or otherwise attached, to a horizontally facing side 90 of the aft end rail 56.

The post 300 includes webs 386 that extend along planes that are angled relative to horizontal. A platform portion 374 of the post 300 provides a threaded bore 388, which is configured to receive a mechanical fastener extending through an aperture in the upper tier tray 64.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
an upper tier tray;
an upper battery module supported on the upper tier tray;
a post that supports the upper tier tray;
an enclosure and a cross-member within an interior of the enclosure, the post mounted on the cross-member; and
a first attachment flange of the post and a second attachment flange of the post, the first attachment flange secured to a first horizontally facing side of the cross-member, the second attachment flange secured to an opposite, second horizontally facing side of the cross-member.

2. The battery assembly of claim 1, further a lower battery module on a lower tier, the lower battery module vertically beneath the upper tier tray and the upper battery module.

3. The battery assembly of claim 1, wherein the post is one of a plurality of posts that are mounted on the cross-member and that support the upper tier tray.

4. The battery assembly of claim 1, further comprising a tower portion of the post, the first and second flanges extending vertically downward from the tower portion.

5. The battery assembly of claim 4, wherein the tower portion tapers as the post extends vertically upward.

6. The battery assembly of claim 4, wherein the tower portion includes a first outer wall, a second outer wall, and a plurality of webs extending between the first outer wall and the second outer wall.

7. The battery assembly of claim 6, wherein the plurality of webs includes at least a first web and a second web, the first web oriented horizontally and placed against a vertically facing surface of the cross-member, the second web oriented along a vertically angled plane.

8. The battery assembly of claim 6, wherein the first attachment flange is an extension of the first outer wall, and the second attachment flange is an extension of the second outer wall.

9. The battery assembly of claim 8, wherein a thickness of the first attachment flange is greater than a thickness of the first outer wall, and a thickness of the second attachment flange is greater than a thickness of the second outer wall.

10. The battery assembly of claim 6, wherein the first and second outer walls extend vertically to a platform, the platform configured to couple to a mechanical fastener to secure the upper tier tray to the post.

11. The battery assembly of claim 10, wherein the platform comprises a threaded bore.

12. The battery assembly of claim 1, wherein the first horizontally facing side faces forward relative to an orientation of an associated vehicle, wherein the second horizontally facing side faces rearward relative to the orientation of the associated vehicle.

13. A battery module support method, comprising:
supporting an upper tier tray with a post;
supporting an upper battery module with the upper tier tray; and
securing a first attachment flange of the post to a first horizontally facing side of the cross-member and a second attachment flange of the post to an opposite, second horizontally facing side of the cross-member.

14. The battery module support method of claim 13, wherein the post is secured to a cross-member within a traction battery.

15. The battery module support method of claim 13, wherein the first horizontally facing side faces forward relative to an orientation of an associated vehicle, wherein the second horizontally facing side faces rearward relative to the orientation of the associated vehicle.

16. The battery module support method of claim 13, wherein the post tapers toward a vertically upper end.

17. A battery assembly, comprising:
an upper tier tray;
an upper battery module supported on the upper tier tray;
a post supporting the upper tier tray; and
an enclosure and a cross-member within an interior of the enclosure, the post separate from the cross-member, the post secured mounted on the cross-member and secured directly to the cross-member.

* * * * *